United States Patent
King

(10) Patent No.: US 6,532,446 B1
(45) Date of Patent: Mar. 11, 2003

(54) SERVER BASED SPEECH RECOGNITION USER INTERFACE FOR WIRELESS DEVICES

(75) Inventor: Peter F. King, Half Moon Bay, CA (US)

(73) Assignee: Openwave Systems Inc., Redwood City, CA (US)

( * ) Notice: Subject to any disclaimer, the term of this patent is extended or adjusted under 35 U.S.C. 154(b) by 121 days.

(21) Appl. No.: 09/643,558

(22) Filed: Aug. 21, 2000

Related U.S. Application Data

(60) Provisional application No. 60/167,290, filed on Nov. 24, 1999.

(51) Int. Cl.⁷ .......................... G10L 21/06; G10L 15/22; G10L 15/26
(52) U.S. Cl. .................... 704/270.1; 704/231; 704/235; 704/275
(58) Field of Search ................................ 704/231–245, 704/258, 260, 270, 270.1, 273, 235, 275; 379/357.01, 88.14; 455/433, 405; 709/206

(56) References Cited

U.S. PATENT DOCUMENTS

| | | | | |
|---|---|---|---|---|
| 5,335,276 A | * | 8/1994 | Thompson et al. | 379/357.01 |
| 5,651,056 A | * | 7/1997 | Eting et al. | 704/270 |
| 5,928,325 A | * | 7/1999 | Shaughnessy et al. | 709/206 |
| H1895 H | * | 10/2000 | Hoffpauir et al. | 455/433 |
| 6,167,251 A | * | 12/2000 | Segal et al. | 455/405 |
| 6,351,523 B1 | * | 2/2002 | Detlef | 379/88.14 |

FOREIGN PATENT DOCUMENTS

| | | | | |
|---|---|---|---|---|
| EP | 0854418 A2 | | 7/1998 | |
| GB | 2323693 A | | 9/1998 | |
| JP | 06-037711 | * | 2/1994 | H04B/7/26 |
| JP | 2001-268241 | * | 9/2001 | G10L/13/00 |
| WO | WO 95/17746 A1 | | 6/1995 | |

OTHER PUBLICATIONS

Reinhold Haeb–Umbach, "Robust Speech Recognition for Wireless Networks and Mobile Telephony," ESCA, Eurospeech97, pp. 2427–2430, Rhodes, Greece, Sep. 22, 1997, XP–001045185.

* cited by examiner

Primary Examiner—Doris H. To
Assistant Examiner—Daniel Nolan
(74) Attorney, Agent, or Firm—Blakely, Sokoloff, Taylor & Zafman LLP

(57) ABSTRACT

A wireless communication system that utilizes a remote voice recognition server system to translate voice input received from serviced mobile devices into a symbolic data file (e.g. alpha-numeric or control characters) that can be processed by the mobile devices. The translation process begins by establishing a voice communication channel between the serviced mobile device and the voice recognition server. A user of the mobile device then begins speaking in a fashion that may be detected by the voice recognition server system. Upon detecting the user's speech, the voice recognition server system translates the speech into a symbolic data file, which is then forwarded to the user through a separate data communication channel. The user, upon receiving the symbolic data file at the mobile device, reviews and edits the content and further utilizes the file as desired.

52 Claims, 8 Drawing Sheets

SERVER BASED SPEECH RECOGNITION USER INTERFACE FOR WIRELESS DEVICES

This application hereby claims the benefit of the filing date of a provisional application entitled, "Voice Recognition Based User Interface for Wireless Devices," serial No. 60/167,290, filed on Nov. 24, 1999. The provisional application is hereby incorporated by reference into the present application.

BACKGROUND OF THE INVENTION

1. Field of Invention

This invention generally relates to data communications, and in particular to a two-way wireless communication device that utilizes network based speech recognition resources to augment the local user interface.

2. Discussion of Related Art

The use of hypertext based technologies has spread to the domain of wireless communication systems. Two-way wireless communication devices, also described as mobile devices herein, and wireless network protocols have been designed to permit interactive access to remote information services (e.g. commercial databases, email, on-line shopping), through a variety of wireless and wire-line networks, most notably the Internet and private networks.

Many mobile devices (e.g. cellular telephones) are mass-market consumer oriented-devices. Their user interface should thus be simple and easy to use without limiting the functionality of the device. Currently, the primary method of data entry for most mobile devices is a keypad that is relatively inefficient when used to input lengthy alphanumeric character strings. Due to size constraints and cost considerations, the keypads of these mobile devices are not a particularly user friendly interface for drafting messages requiring substantial user input (e.g. email messages). Keypads of this type usually have between 12 and 24 keys, a sufficient number for numeric inputs but very inefficient when dealing with the alphanumeric data entries required for network capable devices.

A user requesting information from the Internet generally navigates the World Wide Web using a browser. For example, a user requesting information on Stanford University using a search engine would have to input a search string which includes a Uniform Resource Locator (URL) of the search engine followed by "Stanford University".

The search string may include quite a few characters, in some cases over 40 characters. A user would have no problem inputting a string of this type using a standard desktop computer keyboard and browser (e.g. NETSCAPE or EXPLORER). However, the same user operating the keypad of a mobile device to input the same string would be severely hampered by the compact keypad and the close spacing between the keys.

One of the common uses of the Internet is email. A user who desires to send an email message having the size of the paragraph above would have to input over 400 characters. Using the standard keyboard of a desktop computer, a user may be able to input that number of characters in less than two minutes (assuming the user could type with an average degree of skill). Inputting the same number of keystrokes on the keypad of a mobile device could take considerably longer and become very tedious and prone to error.

Recent advances in speech recognition (SR) technology and increases in hardware capabilities are making the development of speech recognition based user interfaces for desktop systems commercially viable. SR technology takes spoken words and translates them into a format, which can easily be manipulated and displayed by digital systems. There have been efforts to equip compact mobile devices with SR technology, however, these efforts have generally required costly device modifications such as extra components (e.g. a DSP chip) or increased processing and storage capability. A typical cellular phone has computational resources equivalent to less than one percent of what is provided in a typical desktop or portable computer. A phone of this type running a scaled down SR application would only be able to recognize a small-predefined group of spoken words without modifying the device components.

Speech recognition software currently available for desktop and laptop computers (e.g. NATURALLY SPEAKING from Dragon System, Inc., PLAINTALK from Apple Computer, VIA VOICE from IBM and FREESPEECH from Philips Talk) are expensive and would represent a significant portion of the costs of a mobile device equipped with a comparable software application.

Placing a speech recognition software application in each mobile device and modifying its hardware components to run that application creates a financial disincentive for the handset manufacturers to incorporate SR features in their devices. These modifications would add considerable cost to the final price of the mobile device, possibly pricing them out of the target price range usually occupied by mass-market mobile devices (e.g. cellular telephones).

In terms of hardware resources, these applications can require up to 60 Mbytes of memory for each language supported. Additionally most of the commercially available speech recognition software applications are designed to function on systems having relatively fast processors.

There is thus a great need for apparatuses and methods that enable mobile devices to interact in a more efficient manner with digital computer networks. The ability to utilize speech recognition services in conjunction with the standard mobile device user interface (e.g. a phone keypad), without having to significantly modify hardware resources or costs, would dramatically improve the usability and commercial viability of network capable mobile devices having limited resources.

SUMMARY OF THE INVENTION

The present invention relates to a wireless communication system that utilizes a remote speech recognition server system to translate voice input received from mobile devices into a symbolic data file (e.g. alpha-numeric or control characters) that can be processed by the mobile devices. The translation process begins by establishing a voice communication channel between a mobile device and the speech recognition server. A user of the mobile device then begins speaking in a fashion that may be detected by the speech recognition server system. Upon detecting the user's speech, the speech recognition server system translates the speech into a symbolic data file, which is then sent to the user through a separate data communication channel. The user, upon receiving the symbolic data file at the mobile device, reviews and edits the content of the symbolic data file and further utilizes the file as desired. For example a user could use the symbolic data file to fill in fields in an email or a browser request field.

The invention can be implemented in numerous ways, including as a method, an apparatus or device, a user interface, a computer readable memory and a system. Several embodiments of the invention are discussed below.

According to one embodiment, the present invention is a method for obtaining speech recognition services for a mobile device not having the resources and/or software for performing speech recognition processing locally. The method comprises using local applications resident within the mobile device to establish and coordinate a voice channel between the subject mobile device and a remote server system running a speech recognition application (referred to herein as a speech recognition server system).

Upon establishment of the voice channel the user of the subject mobile device is queued to begin speaking into the microphone of the mobile device (e.g. a cellular phone). Voiced input received at the speech recognition server system, as a result of this interaction, is converted into a symbolic data file. This process may be assisted by previously stored user specific data files. The symbolic data file is then sent back to the originating mobile device or a designated third party device through a separately established and coordinated data communication channel. The symbolic data file may be used to interact with local applications on the mobile device or to interact with network resources (e.g. servers on the Internet or a private network).

Other objects and advantages, together with the foregoing are attained in the exercise of the invention in the following description and accompanying drawings.

BRIEF DESCRIPTION OF DRAWINGS

The present invention will be readily understood by the following detailed description in conjunction with the accompanying drawings, wherein the reference numerals illustrate the structural elements, and in which.

DETAILED DESCRIPTION OF THE INVENTION

In the following detailed description of the present invention, numerous specific details are set forth in order to provide a thorough understanding of the present invention. However, it will become obvious to those skilled in the art that the present invention may be practiced without these specific details. In other instances, well known methods, procedures, components, and circuitry have not been described in detail to avoid unnecessarily obscuring aspects of the present invention. The detailed description of the present invention in the following are presented largely in terms of procedures, steps, logic blocks, processing, and other symbolic representations that resemble data processing devices coupled to networks. These process descriptions and representations are the means used by those experienced or skilled in the art to most effectively convey the substance of their work to others skilled in the art.

The invention pertains to systems and methods, which enable a mobile device to access speech recognition services from a networked speech recognition server system. According to one embodiment of the present invention, speech recognition services are accessed by establishing a voice channel between the user of a mobile device desiring speech recognition services and a networked speech recognition server system.

Once a voice channel is established, the user of the mobile device is given a queue to begin speaking when the speech recognition server system is ready to receive a speech signal. The received speech signal is processed by the speech recognition server system using speech recognition techniques well known in the art (e.g. template matching, Fourier transforms or linear predictive coding (LPC)) and a symbolic data file is generated.

A symbolic data file is a file containing a plurality of letters, phonemes, words, figures, objects, functions, control characters or other conventional marks designating an object, quantity, operation, function, phoneme, word, phrase or any combination thereof having some relationship to the received speech signal as interpreted by the speech recognition system. Speech recognition systems generally use voice templates, Fourier Transform coding, or a linear predictive coding scheme to map the voiced input components to pre-stored symbolic building blocks. Examples of symbolic data files include ASCII files and binary data files.

To facilitate a description of the present invention, it is useful to recite some of the features of a communication system in which the invention may be practiced. FIGS. 1 through 4 provide an overview of the principal system components.

Figure 1:
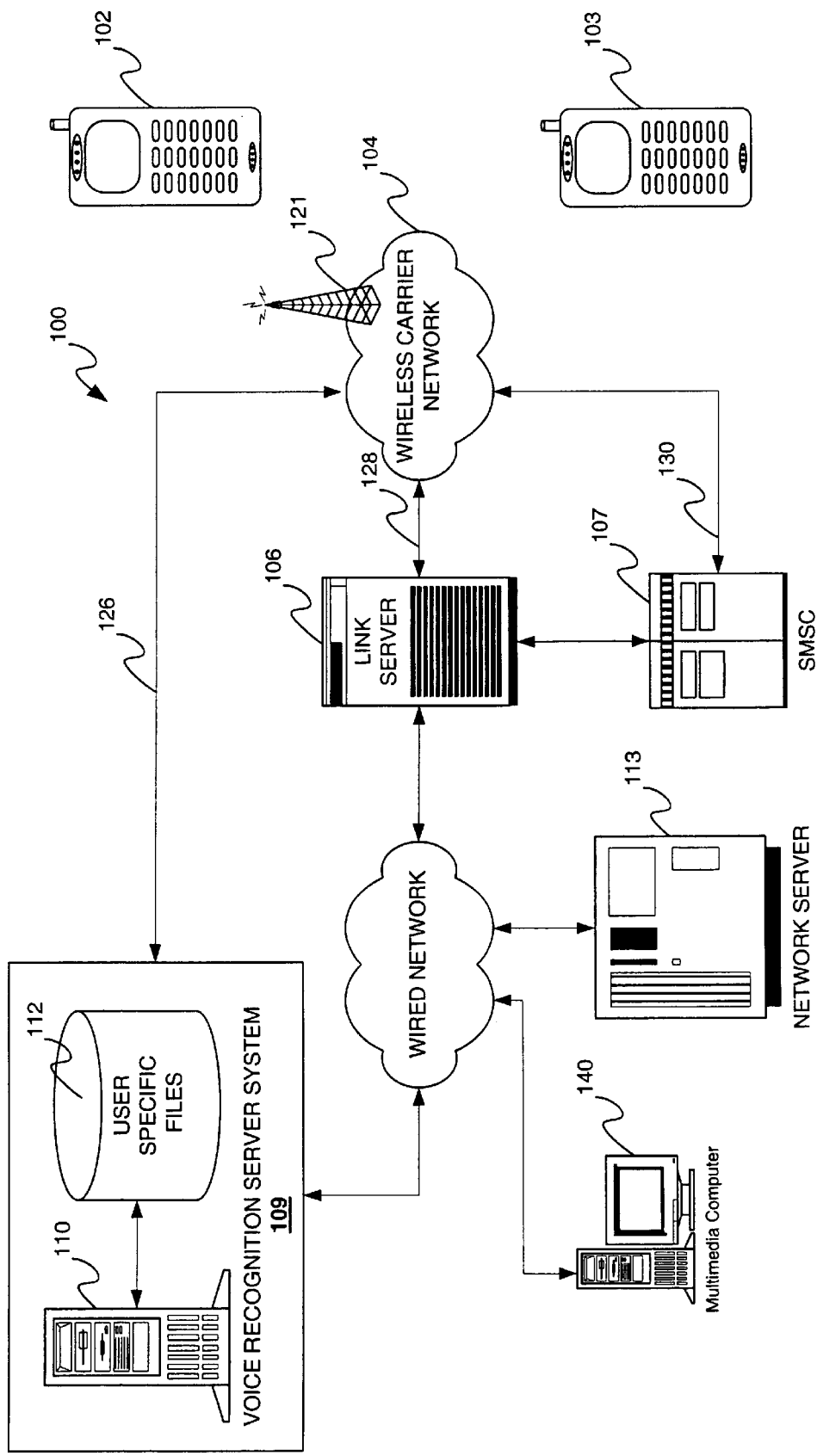
FIG. 1 illustrates a schematic configuration in which the present invention may be practiced.

Referring to FIG. 1 a block diagram of a typical communication system 100 according to one embodiment of the present invention is displayed. Mobile devices 102 and 103 receive phone calls through a voice communication channel and hypermedia information (e.g. Hyper Text Markup Language (HTML) documents, Compact Hypertext Transport Protocol (cHTML) documents, Extensible Markup Language (XML) documents, Handheld Device Markup Language (HDML) documents, or Wireless Markup Language (WML) documents, or other similar data types) from remote server devices through broad-band and narrow-band (e.g. SMS) data communication channels which may include link server device 106 and Short Message Service center (SMSC) 107.

Mobile devices 102 and 103 each have a display and a user interface. Additionally, mobile devices 102 and 103 may have a micro-browser (e.g. a micro-browser from Openwave Systems Inc., 1400 Seaport Boulevard, Redwood City, Calif., 94063) stored in a local memory (also referred to as a client module) which enables the device to process hypermedia information received from remote server devices.

As shown in FIG. 1, mobile devices 102 and 103 may be coupled to link server device 106 through a wireless carrier network 104 (also referred to herein as a wireless network). Mobile devices 102 and 103 may be taken from a group, which includes mobile phones, palm sized computing devices and personal digital assistants with voice transmission and/or reception capabilities. Voice capabilities are defined as the capabilities equipped in a mobile device that allow a user to communicate voice based information to and from remote destinations (e.g. to another user or a device).

Access to the voice communication channel generally requires that the user and/or device be recognized by wireless carrier network 104. Network recognition involves the exchange of identification information between a subject mobile device and wireless carrier network 104. Generally, the identification information for the user and/or mobile device in question is stored in the memory of the device and is transmitted automatically when the user attempts to access the network.

Wireless carrier network 104 may be any of the well known wireless communication networks (e.g. cellular digital packet data (CDPD) network, Global System for Mobile Communication (GSM) network, Code Division Multiple Access (CDMA) network, Personal Handy Phone System (PHS) or Time Division Multiple Access (TDMA) network). Link server device 106 is further coupled to a wired network 108 to which a speech recognition server system 109 and a plurality of networked servers represented by network server 113 are coupled.

Speech recognition server system 109 is comprised of a server device 110 and storage facilities 112 capable of storing, among other things, user specific files associated with a plurality of user's serviced by a carrier entity. The user specific files are utilized in conjunction with speech recognition processing and in one embodiment are part of the present invention.

Examples of user specific files might include user specific speech templates, one or more user specified language dictionaries (e.g. French, English, German or Cantonese) and one or more user specific dictionaries or lists of an individual user's frequently used words. These files may be uploaded and managed using a networked multimedia computer (e.g. multimedia computer 140) or through the user interface of the serviced mobile device. For example, voice templates are generated by having the user read a predetermined script into a voice-enabled device. User preferences (e.g. languages of choice) may be input using menu selection screens presented to the user on the display of the mobile device or another device connected to the speech recognition server system via a wired network.

For simplicity, antenna 121 represents a wireless carrier infrastructure that generally comprises a base station and an operations and maintenance center. The base station controls radio or telecommunication links with mobile devices 102 and 103. The operations and maintenance center comprises a mobile switching center, which switches calls between the mobile devices and other fixed or mobile network users. Further the operations and maintenance center manages mobile account services, such as authentication, and oversees the proper operation and setup of the wireless network. Each of the hardware components and processes in carrier infrastructure 121 are known to those skilled in the art and will not be described herein to avoid unnecessarily obscuring aspects of the present invention.

The communication protocols used by airnet 104 may, for example, be Wireless Access Protocol (WAP) or Handheld Device Transport Protocol (HDTP). Wired network 108 is a land-based network that may be the Internet, a private network or a data network of any private network. Typically the communication protocol supporting landnet 118 may be Transmission Control Protocol (TCP/IP), Hypertext Transport Protocol (HTTP), or Secure Hypertext Transport Protocol (sHTTP).

Link server device 106 and network server 113 are typically computer work stations, for example, a SPARC station from Sun Microsystems Inc. with networking libraries and Internet connectivity. Network server 113 is representative of a plurality of networked servers coupled to landnet 108 and is capable of providing access to hypermedia information including information for mobile devices 102 and 103.

Link server device 106 is depicted as a stand alone device and therefore is often referred to as a network gateway or wireless data server. Link server 106 can be configured to operate as a bridge between wireless network 104 and wired network 108. It should be pointed out that the functions of link server device 106 may be performed by other server devices connected to wired network 108 with hardware well known in the art providing the connection between wireless network 104 and wired network 108.

The voice communication channel previously described is generally represented by voice channel 126. This communication channel is generally established and coordinated using the infrastructure and procedures generally known in the art for setting up a phone call.

There are generally two types of data communication channels providing service to mobile devices 102 and 103. Data communication channel 128 is representative of a wideband data communication channel. Data communication channel 130 is representative of a narrowband data communication channel e.g. (a Short Message Communication (SMS) service channel). Either of these data communication paths can be used to deliver data to and from mobile devices 102 and 103.

According to the preferred embodiment of the present invention a mobile device (e.g. mobile device 102 or 103) desiring to receive speech recognition services from speech recognition server system 109, first establishes a voice channel generally represented by voice channel 126. The contact information for speech recognition server system 109 (e.g. a phone number or a uniform resource indicator (URI)) may be embedded in software loaded on the mobile device, retrieved from link server device 106 or input by the user directly.

Once a voice channel is established between the requesting mobile device and speech recognition server system 109, user information is sent to the speech recognition server system. This allows previously stored user specific files for the requesting mobile device to be accessed and utilized. The user information may be transmitted on a separate data communication channel (e.g. data communication channels 128 or 130) or input by the user. The user specific files generally provide for features specific to a particular user account. For example, the user can specify one or more languages of choice for speech recognition processing.

Once the user specific files for the subject mobile device/user are retrieved, the user is prompted to provide a voiced input (e.g. begin speaking). It is important to note at this point that the user may utilize the user interface of the mobile device (e.g. a phone keypad) while utilizing speech recognition services. When the user has completed their input interaction (voice and physical input) with the mobile device, an indication may be provided by the user (voiced or key input) to conclude the input session. Speech recognition server system 109 then converts the voiced input into a symbolic data file, which can be sent to the requesting mobile device via link server 106.

As previously stated, the symbolic data file is a file containing a plurality of letters, phonemes, words, figures, objects, functions, control characters or other conventional marks designating an object, quantity, operation, function, phoneme, word, phrase or any combination thereof having some relationship to the received speech signal as interpreted by the speech recognition system. Speech recognition systems generally use voice templates, Fourier Transform coding, or a linear predictive coding scheme to map the voiced input components to pre-stored symbolic building blocks. Examples of symbolic data files include ASCII files and binary data files.

The symbolic data file may initially be sent to link server device 106, which may perform additional processing prior to sending the symbolic data file to the requesting mobile device via wideband channel 128 or narrowband channel 130. The user of the mobile device may then review the received symbolic data file and utilize it as desired.

The accuracy of the speech recognition application used by speech recognition server system 109 will vary depending on the translation methodology used and the size and language of the language dictionaries used. Generally, speaker dependent methodologies (e.g. template matching) have accuracy's as high as 98 percent and speaker-independent methodologies (e.g. Fourier transforms and linear predictive coding (LPC)) have accuracy's in the range of 90 to 95 percent.

In accordance with the principles of the present invention, users of mobile devices (e.g. mobile devices 102 and 103) may access speech recognition services on those mobile devices without the significant hardware or software modifications that might be required if the speech recognition application were executed by the device. Additionally, since the software performing speech recognition processing is resident on an accessible remote server device with superior processing speed (as compared to that of the mobile device) and large storage capacity, the user of the device can be provided with the functionality and resources associated with a full featured speech recognition application. For example, the speech recognition application may have access to large language dictionaries, selectable language dictionaries for multiple languages and user specific files (e.g. voice templates and user customized dictionaries and lists).

Figure 2A:
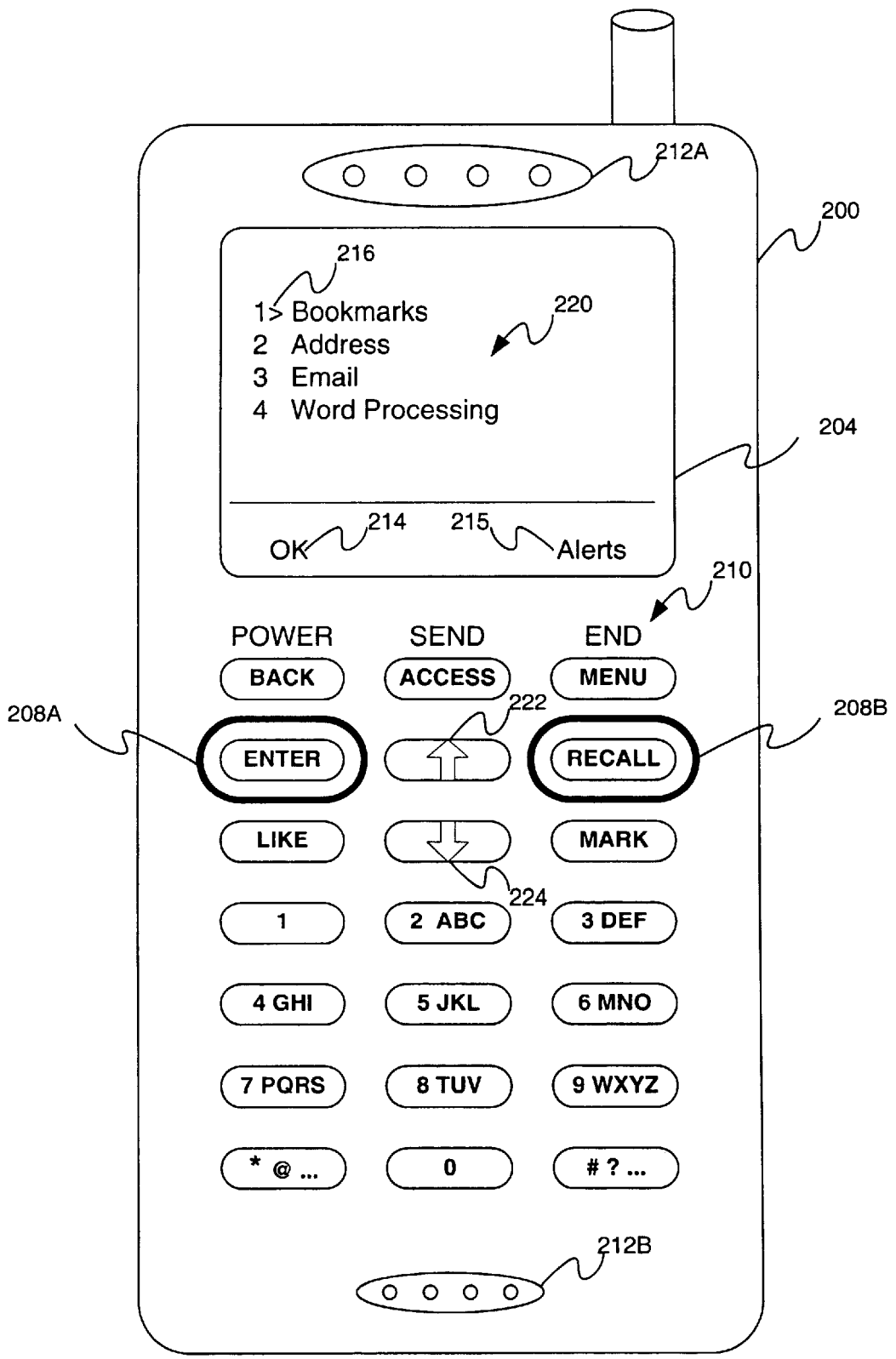
FIG. 2A depicts display and user interface components of a typical voice capable mobile device.

FIG. 2A depicts an exemplary mobile device 200 that may correspond to one of mobile devices (102 or 103) in FIG. 1. Mobile device 200 includes a display screen 204, an extended phone-styled keypad 210, cursor navigation keys 222 and 224, a pair of softkeys 208A and 208B, an earpiece 212A and a microphone 212B. Screen display 204 is typically a Liquid Crystal Display (LCD) 220 screen capable of displaying textual information and certain graphics. Extended phone keypad 210 includes, preferably, a regular phone keypad with additional keys providing additional characters (e.g. a space) and functions (e.g. back or clear).

Cursor navigation keys 222 and 224 allow a user to reposition a cursor or an element indicator 216, for example, to activate one of the applications displayed on screen display 204. Generic keys 208A and 208B are typically used to perform application specific functions as indicated by softkey function identifiers 214 and 215. It should be understood, by those having ordinary skill in the art, that having a regular phone keypad is not a requirement to practice the present invention. Some mobile devices sometimes have no physical keys at all, such as those palm-sized computing devices that use soft keys or icons as an input mechanism.

Upon establishing a communication session with an associated link server device (e.g., link server device 106 of FIG. 1) mobile device 200 typically receives one or more markup language card decks to assist the user with device interactions. Depending on the implementation preference, the markup language card decks, alternatively referred to as screen descriptive commands files, may be in a markup language that includes, but is not limited to, Handheld Device Markup Language (HDML), Hypertext Markup Language (HTML), compact HTML, Wireless Markup Language (WML), Standard Generalized Markup Language (SGML) or Extensible Markup Language (XML). Alternatively, the data file may be a stripped, compressed, compiled or converted version of a corresponding markup file.

Text 220 appearing on LCD screen 204 in FIG. 2A is an example of a markup language card deck. In this example the user is offered a choice of the following selections:

1) Bookmarks
2) Search Int.
3) Email
4) News

Each of the selections is typically linked to a resource on the network or to a local software application. A user may make a selection from the menu above using navigation keys 222 and 224 with the user's selection indicated by element indicator 216. This same method may be utilized to provide user prompts for interacting with remote server devices (e.g. speech recognition server system 109 of FIG. 1).

Figure 2B:
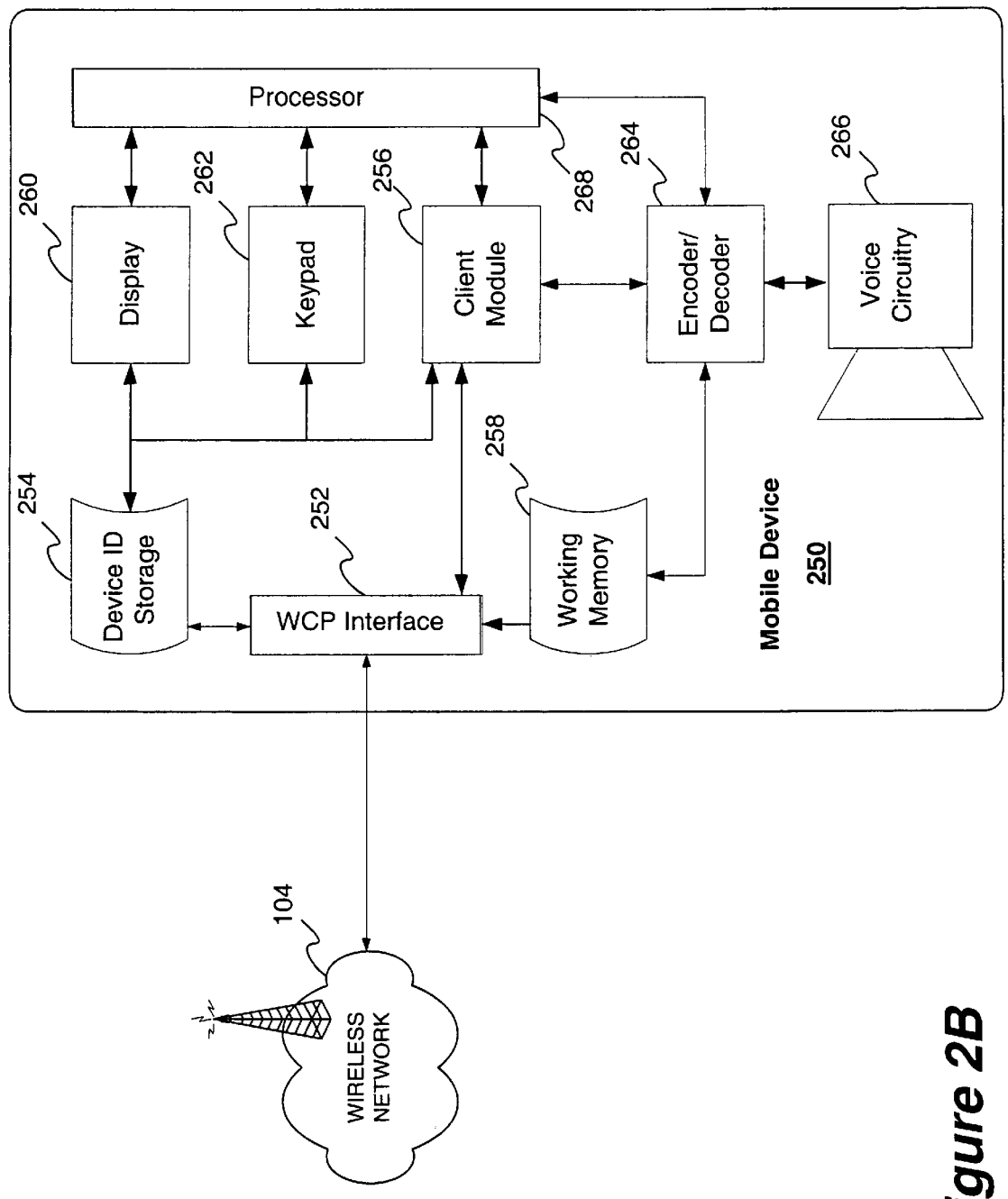
FIG. 2B illustrates a functional block diagram of an exemplary voice capable mobile device.

Referring now to FIG. 2B, a more detailed description of mobile device 250, which may be mobile devices 102 or 103 of FIG. 1 and 200 of FIG. 2A, is provided. Mobile device 250 includes a Wireless Control Protocol (WCP) interface 252 that couples to a carrier wireless network 104 to receive incoming and outgoing signals. Device identifier (ID) storage 254 stores and supplies a device ID to WCP interface 252 for the purpose of identifying mobile device 250 to outside entities (e.g. link server device 106 of FIG. 1). The device ID is a specific code that is associated with mobile device 250 and directly corresponds to the device ID in an associated user account typically provided in an associated link server device (e.g. 106 of FIG. 1).

Mobile device 250 includes a processor 268, encoder/decoder circuitry 264, working memory 258 and a client module 256. Client module 256 is representative of software components loaded on or into device memory resources, which performs many of the processing tasks performed by mobile device 250 including; establishing a communication session with a link server device via wireless carrier network 104, operating and maintaining local applications, displaying information on a display screen 260 of mobile device 250, and receiving user input from keypad 262. Client module 256 may be loaded into the memory of mobile device 250 in much the same fashion as software is loaded on a computing device.

In addition, mobile device 250 includes voice circuitry 266 for converting voice activity to electrical impulses which may be transmitted and received on digital and analog communication systems. These components and their functions are well known in the art and will not be discussed further.

In accordance with the principles of the present invention, the software loaded on mobile device 200 includes a component, which provides assistance to the user relating to interactions with the server device running the speech recognition application. The software providing this assistance may be loaded as part of the microbrowser or other application, or as a stand alone application. This application may be responsible for tasks such as retrieving and storing contact information for server devices providing services, management of received symbolic data files, and input/alteration of user preferences. User assistance may be in the form of screen displayed information, audible or tactile prompts and/or softkey mapped functions, for example.

For example, a user desiring to utilize speech recognition services in conjunction with an application (e.g. an email message) may access the application of interest and activate a softkey to access speech recognition services. The function associated with the softkey would then retrieve the contact information for the server device running the speech recognition application, if not already stored, and the process would proceed as described above. This example is provided for purposes of illustration and should not be interpreted as limiting the scope of the present invention.

Figure 3:
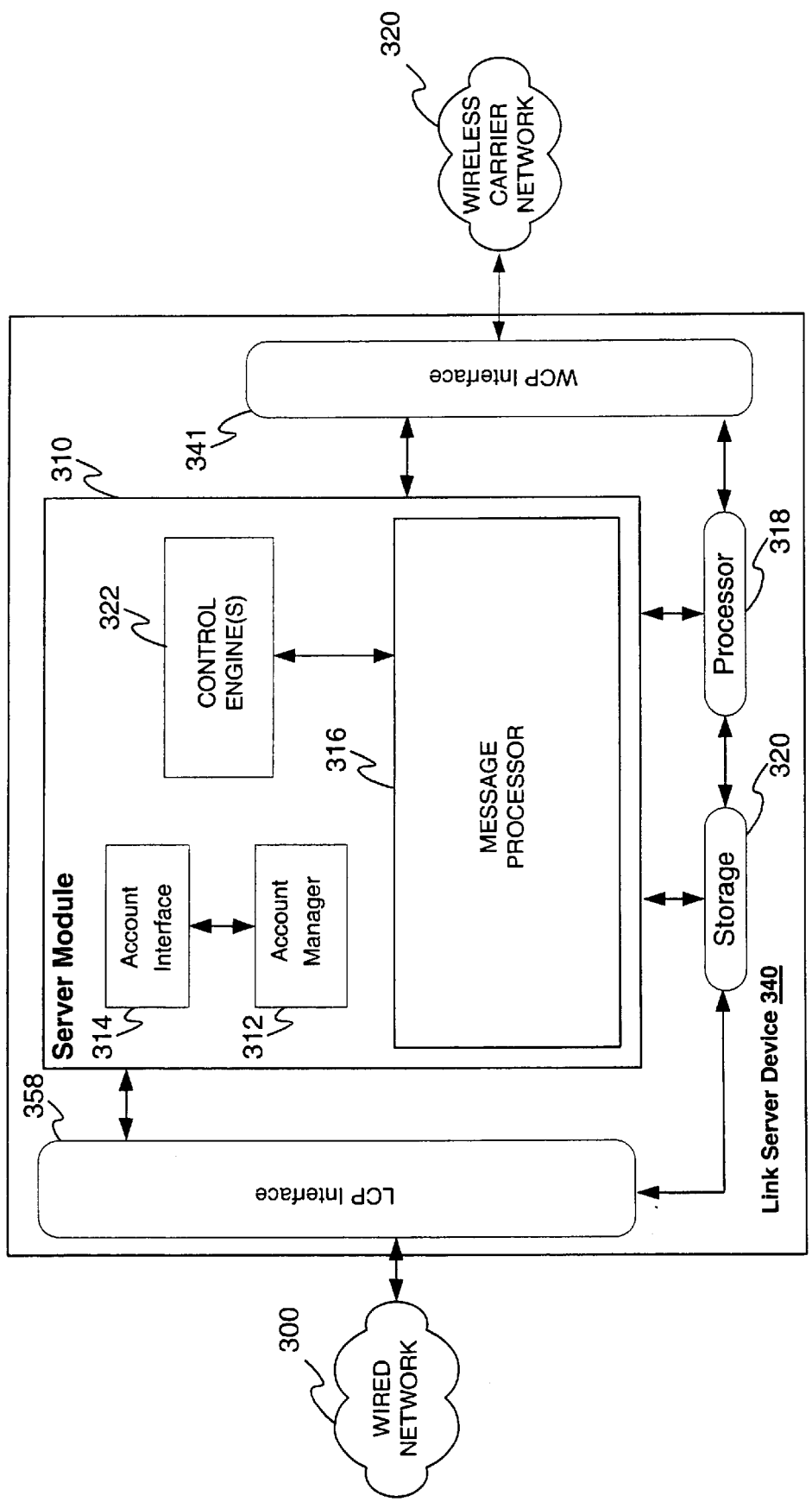
FIG. 3 illustrates a functional block diagram of a link server device according to a preferred embodiment of the present invention.

FIG. 3 schematically illustrates the principle components of link server device 340, which may correspond to link server device 106 of FIG. 1. Link server device 340 is a server computer that operates as a network gateway between wired network 300 and wireless network 320. To avoid obscuring the principle aspects of the present invention, well-known methods, procedures, components and circuitry in link server device 340 are not described in detail.

Link server device 340 includes a Land Control Protocol (LCP) interface 358 that couples to wired network 300, and a Wireless Control Protocol (WCP) interface 341 that couples to wireless network 320. A server module 310 is coupled between the LCP interface 358 and the WCP interface 341.

Server module 310 performs traditional server processing as well as protocol conversion processing from one communication protocol to another communication protocol. Message processor 316 is the component responsible for protocol conversions and associated tasks. In the case of protocol conversions (e.g. between HDTP and HTTP), the conversion is generally a data mapping process. It will be understood by those skilled in the art that WCP interface 341 can be replaced by other interface modules depending on the wireless networks and protocols used. The same is true of LCP interface 358 when the type of wired network and protocol vary.

Server module 310 also includes an account manager 312 and an account interface 314. Account manager 312 manages a plurality of user accounts, typically one for each of the mobile devices serviced by link server device 340. It should be understood that the user account information may be stored in another network server coupled the link server device 340. In other words, the user accounts can be kept in a database that is physically placed in any computing device coupled to link server device 340 via a wired network.

Each of the mobile devices serviced by link server device 340 is assigned an identification (ID) or device ID. A device ID can be a phone number of the device or an IP address or a combination of an IP address and a port number, for example: 204.163.165.132:01905 where 204.163.165.132 is the IP address and 01905 is the port number. The device ID is further associated with a subscriber ID created and administrated by the carrier controlling link server device 340 as part of the procedures involved in activating a subscriber account for mobile device. The subscriber ID may be associated with, and utilized to, access the user specific files (e.g. 112 of FIG. 1) associated with a particular user or device.

The subscriber ID may take the form of, for example, 861234567-10900_pn.mobile.att.net by AT&T Wireless Service, and is a unique identification to a mobile device. The account manager 312 is responsible for creating a user account for a mobile device that allows for secure communications with link server device 340. In this case, account manager 312 ensures the proper level secure access for the serviced mobile device to services provided by link server device 340.

Link server device 340 also includes a processor 318 and storage resource 320 as the primary hardware components. Processor 318 performs operations under the control of the server module 310. It will be understood to those skilled in the art that link server device 340 may include one or more processors (e.g., processor 318), working memory (e.g., storage resource 320), buses, interfaces, and other components and that server module 310 represents one or more software modules loaded into the working memory of link server device 340 to perform designated functions. The same distinction is equally applicable to the client module and hardware components of the subject mobile devices.

Typically the landnet communication protocol (LCP) supported in landnet 300 may include Transmission Control Protocol (TCP), HyperText Transfer Protocol (HTTP) or Secure HyperText Transfer Protocol (HTTPS), and the wireless communication protocol (WCP) may include (TCP), (HTTP) or (HTTPS), Handheld Device Transport Protocol (HDTP) or Wireless Session Protocol (WSP). In the case that LCP is different from WCP, server module 310 includes a mapping module (i.e. a mapper) responsible for mapping from one protocol to another so that a mobile device coupled to wireless network 320 can communicate with a device coupled to wired network 300.

Once the received speech signal is processed by speech recognition server system (not shown), a symbolic data file is generated and sent to link server device 340. The symbolic data file is received by message processor 316 via LCP interface 358. Message processor 316 acting under a control engine 322, converts the symbolic data file to a data format that may be optimally (in terms of the protocol requirements of the wireless network and the device characteristics of the requesting mobile device) transported on wireless network 320. The symbolic data file can be in a format comprehensible by message processor 316, for example, in a markup language (e.g. HTML) or a text file (e.g. ASCII), when received from the speech recognition server system. The processed symbolic data file, which may be reformatted so as to be more compatible with the requesting mobile device, is then sent to the requesting mobile device or to a designated third party device.

Figure 4:
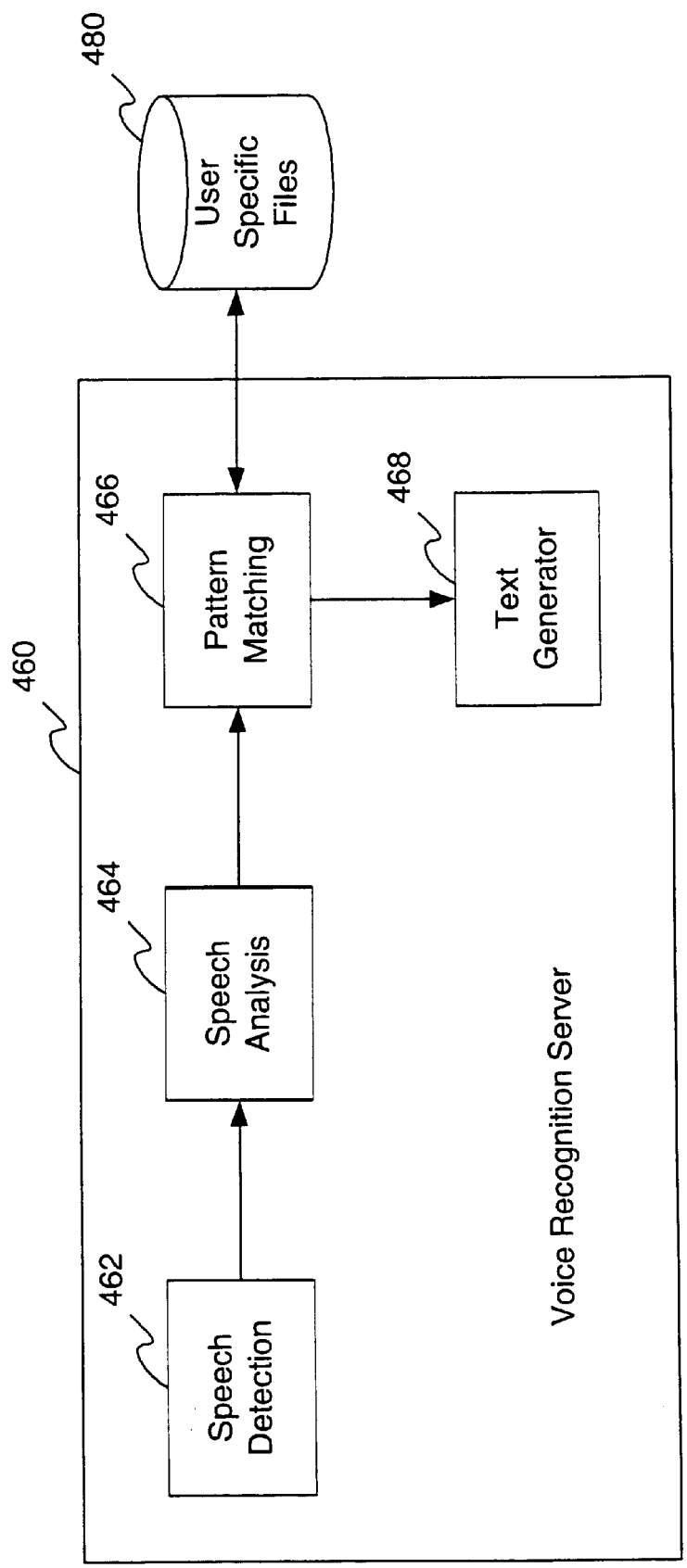
FIG. 4 is a schematic diagram showing exemplary processing stages for the speech recognition server in accordance with an exemplary embodiment of the present invention.

Referring to FIG. 4, there are shown functional modules of an exemplary speech recognition server system 460 (which may correspond speech recognition server system 109 of FIG. 1) that performs the following processes: 1) Speech Detection, 2) Speech Analysis, 3) Pattern Matching and 4) Symbolic File Generation. During speech detection 462, Speech recognition server system 460 detects the presence of a speech signal at its input. Upon detection, the received speech signal goes through the speech analysis process 464, where it is reduced to quantifiable indices suitable for pattern matching. During the pattern matching stage 466, the quantifiable indices are compared to user voice templates (if using a template based speech recognition process) stored in storage device 480 that may include various language dictionaries and a plurality of user specific files. A text generator 468, generated the symbolic data file which is sent to link server device 340 via wired network 300 (see FIG. 3) as previously described. It will be understood, by persons of ordinary skill in the art, that other speech recognition schemes (e.g. Fourier transforms or linear predictive coding (LPC)) may be used without deviating from the scope of the invention. Persons of ordinary skill in the art will also understand that the link server device (e.g. 106 of FIG. 1) may perform the functions of the speech recognition server system (e.g. 109 of FIG. 1).

Figure 5:
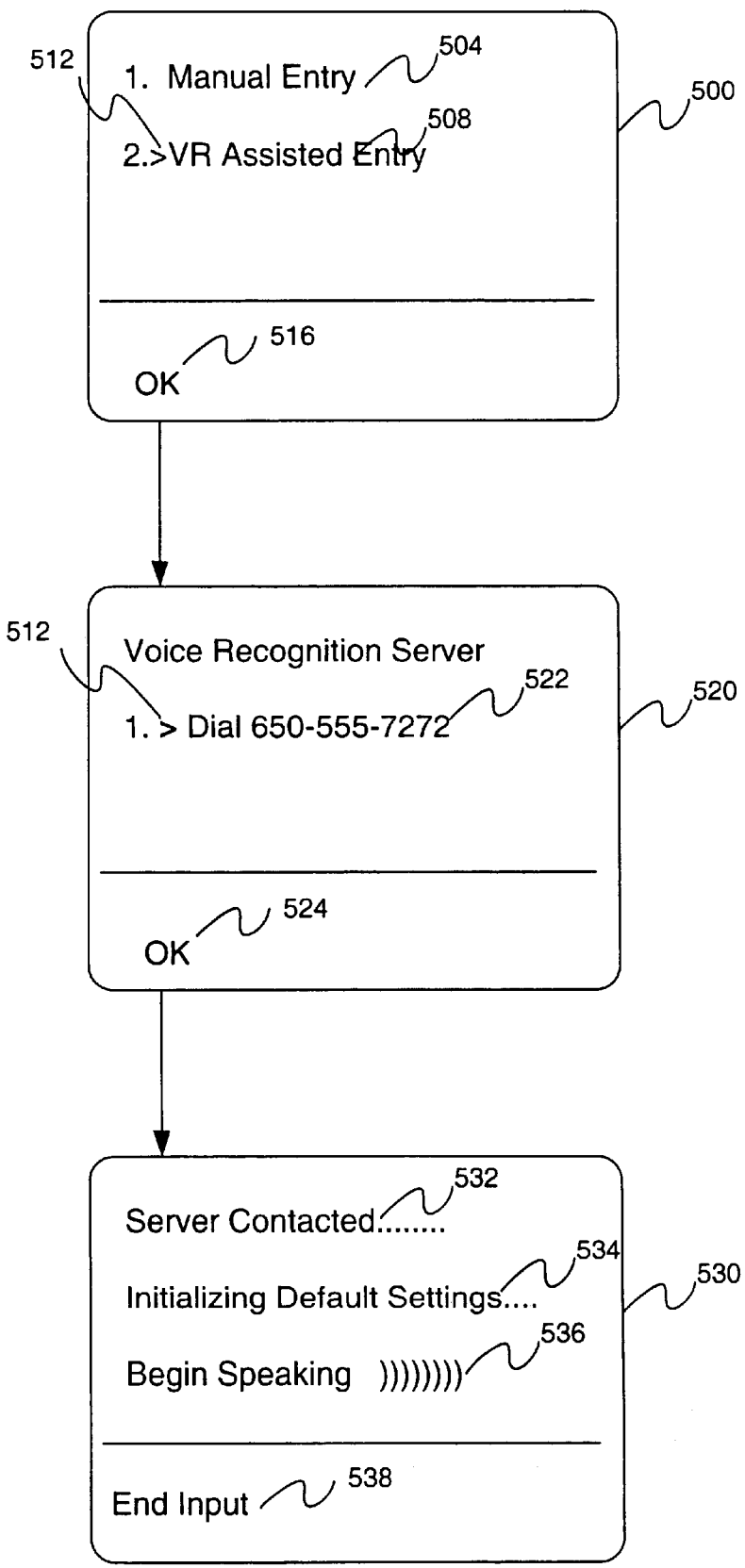
FIG. 5 shows representative screen displays, which illustrate operations relating to the interaction of a mobile device with a speech recognition server system.

FIG. 5 illustrates a plurality of exemplary screen displays relating to the interaction of a mobile device requesting speech recognition services and a speech recognition server system. Initially screen display 500 allows a user to select between manual entry 504 and SR (speech recognition) assisted entry 508. User selections are indicated by selection indicator 512. In this example, SR assisted entry 512 may be selected by activating the softkey associated with softkey function identifier 516. This selection retrieves the contact information for the speech recognition server system providing service. In this example the contact information is comprised of a phone number (e.g. 650-555-7272). One of ordinary skill in the art will understand that the contact information may also be comprised of a Uniform Resource Identifier (URI) or similar unique identifier. Associated user and/or device identification information, utilized for accessing user specific files, may be transmitted in the background (e.g. using a separate data communication channel or the voice communication channel) or input by the user.

Upon retrieval of the speech recognition server system contact information 522, as shown in screen display 520, a voice channel may be established by activating the softkey associated with softkey function identifier 524 ("OK"). Screen display 530 illustrates types of information, which could be provided to the user of the requesting mobile device. Character string 532 provides the user with information relating to the status of establishing a communication session with the speech recognition server system providing service. Character string 534 provides the user with information relating to the settings utilized to process the user's request. This could be comprised of a simple character string (e.g. "Initializing Default Settings") or a plurality of interactive and non-interactive displays which allow a user to input selections (e.g. a language of choice). When the servicing speech recognition server system is ready to receive input a prompt 536 ("begin speaking") is presented to the user. A user may end the input session by activating the softkey associated with softkey function identifier 538.

Speech recognition services may be configured to interact with particular applications resident on the requesting mobile device. For example, processed symbolic data files may be generated to serve as inputs for specific fields in an application such as an email. Additionally, once an active voice channel has been established for speech recognition services, the user may change the application using the service without having to secure and re-establish the voice communication channel. For example, the user may switch between an email program and a personal organizer. This feature reduces user cost and network congestion.

Figure 6:
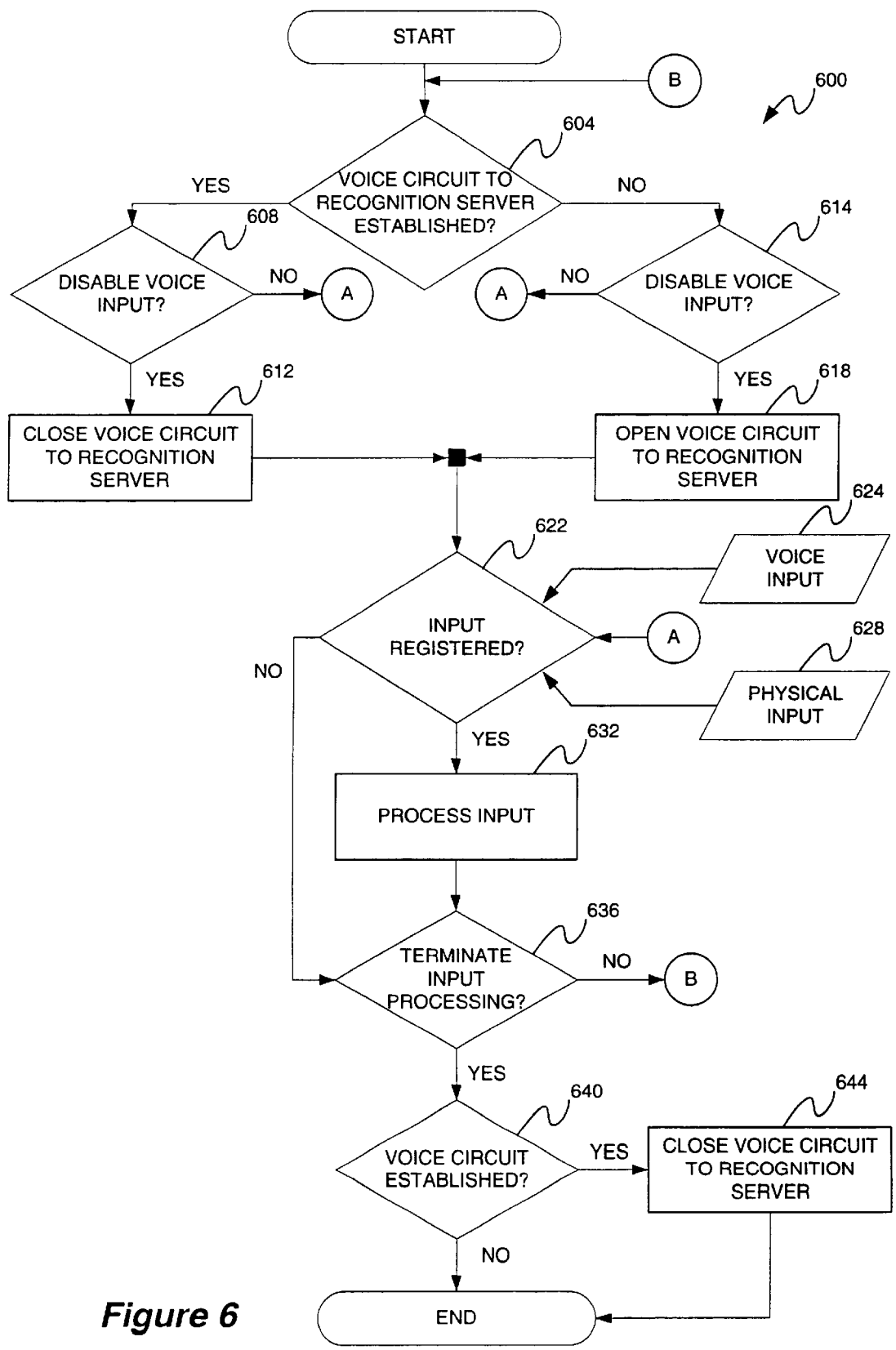
FIG. 6 illustrates a process flowchart from the perspective of the mobile device according to an embodiment the present invention.
Figure 7:
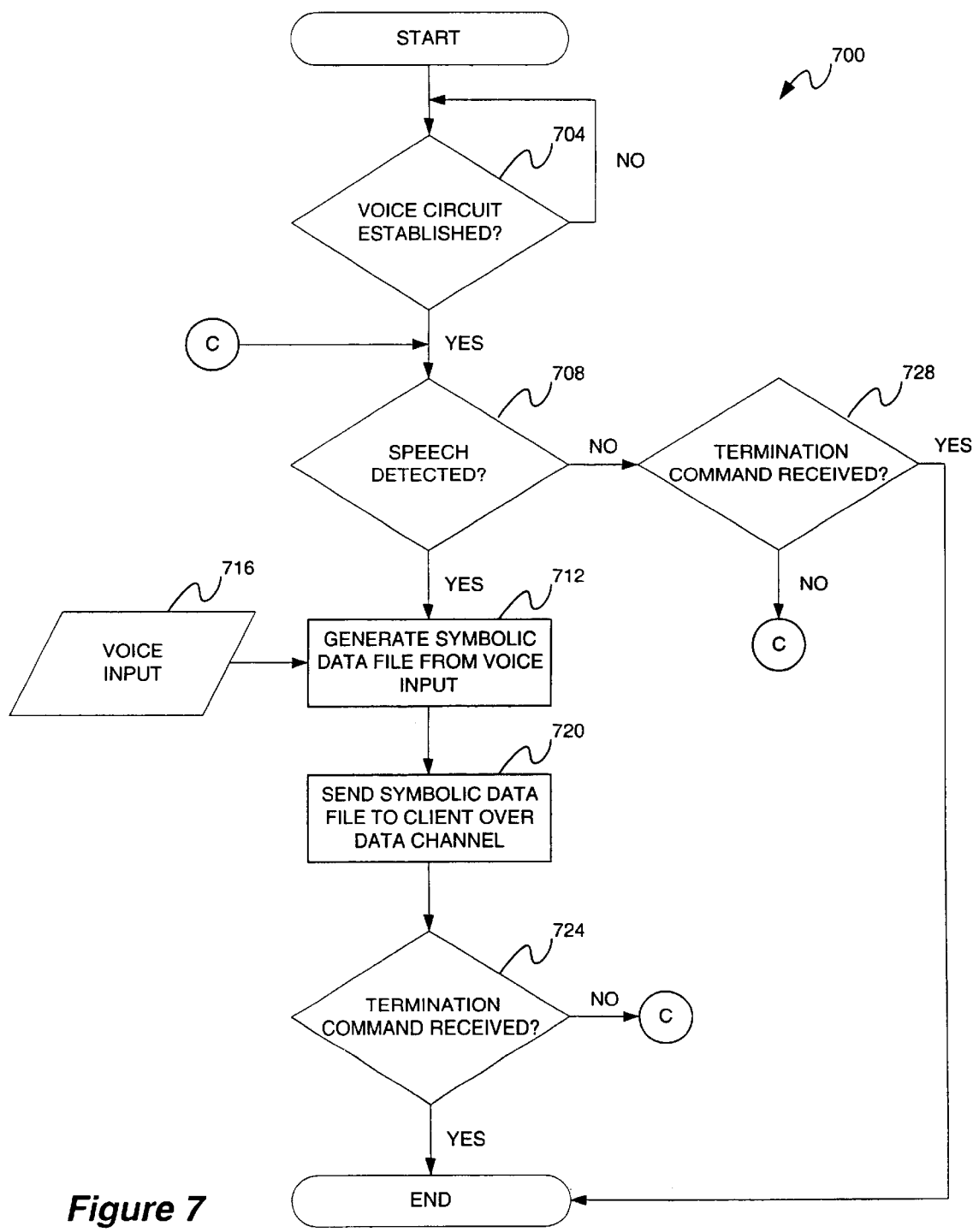
FIG. 7 illustrates a process flowchart from the perspective of the speech recognition server according to an embodiment the present invention.

Referring now to FIG. 6 and FIG. 7, there are respectively illustrated process flowcharts that describe the operations of the mobile device and the speech recognition server according to one embodiment of the present invention. Both FIG. 6 and FIG. 7 should be understood in conjunction with FIG. 1.

In accordance with the preferred embodiment of the present invention, a user desiring speech recognition services would indicate using the local user interface (e.g. by pressing a key) to the mobile device that speech recognition services are required. In response, the mobile device would initiate or generate a request for the speech recognition service. Generally the user would indicate that speech recognition services are required in conjunction with a desired task being performed using resident applications (e.g. email or web browsing). Information returned to the mobile device as a result of the request may be incorporated within a document associated with the task being performed.

The request process causes a voice channel to be established between the mobile device requesting service and the speech recognition server system providing the service. Once the voice channel is established and the user is queued to begin speaking, the user may begin an input interaction with the mobile device which may include physical input using the local user interface (e.g. a phone keypad) in addition to the speech input. Upon completion of the initial input interaction with the mobile device the user may choose to maintain the open status of the voice channel open and perform another task or terminate the voice channel.

FIG. 6 is a flow diagram, which illustrates the process 600 utilized by a mobile device (e.g. mobile devices 102 and 103) to interact with a remote speech recognition server system (e.g. speech recognition server system 109) from the perspective of the mobile device. At 604 a determination is made as to whether there is an active voice channel between the subject mobile device and the speech recognition server system providing services. This process usually occurs in the background under software control.

If there is an active voice channel, then the user is prompted to provide an input at 608 indicating whether the user desires the active voice channel to be disabled. This would be the case where the user does not require SR services for the planned input interaction with the mobile device.

If the user decides to disable the voice channel then it is disabled at 612. The user then proceeds with physical input 628 using the device's user interface (e.g. the keypad). At 622 a decision is made as to whether user input (e.g. physical input 628) has been registered (e.g. input accepted by the device). If the user input is registered then it processed at 632 and the user is prompted to provide an input at 636 indicating whether to continue the input session or terminate it. If the user selects termination then a determination is made as to the status of established voice channels/circuits at 640 (i.e. is the voice channel/circuit active). As was previously described, this check usually occurs in the background. In the sequence described above there is not an active voice channel so the process would be terminated.

If at 608 the user decides not to disable the voice channel, as would be the case where a user intends to utilize speech recognition services for a mobile device input interaction, then the user provides voice input 624 and physical input 628 and a determination is made at 622 as to whether the user's input has been registered. If the user input's has been registered then it processed at 632 and the user is prompted to provide an indication at 636 as to whether the user desires to continue the input session or terminate it. If the user selects termination then a determination is made as to the status of any established voice channels/circuits at 640. If a voice circuit was established, then at 664 the voice circuit is closed. Upon termination, active voice channels/circuits are secured. The process is then terminated.

If the user decides not to terminate the input session at 636 then the process returns to the beginning of process 600.

If a determination is made at 604 that there is not an active voice channel, then the user is prompted to provide an indication at 614 as to whether the user desires an active voice channel to be established. This would be the case where the user requires speech recognition services for an input interaction with the mobile device.

If at 614 the user requests a voice channel for the input interaction then one is established at 618. The user then provides voice input 624 and physical input 628 and a determination is made at 622 as to whether the user's input has been registered. If the user's input has been registered then it is processed at 632 and the user is prompted to provide an indication at 636 whether to continue the input session or terminate it. If the user selects termination then a determination is made, as previously described as to the status of any established voice channels/circuits at 640. Upon termination, active voice channels/circuits are secured. The process is then terminated.

If at 614 the user does not request a voice channel for the impending input interaction, as would be the case where the user does not require speech recognition services, the user then proceeds with physical input 628 using the mobile device user interface (e.g. the keypad). At 622 a determination is made as to whether user input (e.g. physical input 628) has been registered. If the user input has been registered then it processed at 632 and a decision is made at 636 whether to continue the input session or terminate it. The process is then terminated.

If the user decides not to terminate the input session at 636 then the process returns to the beginning of process 600.

If in any of these exemplary interactions described above, the user input is not registered at 622, then the user is prompted to provide an indication at 636 as to whether or not they desire to terminate the session with the speech recognition server system.

Once a voice channel between the speech recognition system providing service and a mobile device requesting service is established, the speech recognition server system may retrieve any user specific files associated with the user of the mobile device (e.g. language preferences, template files etc.) and use these to process the incoming voice input. The speech recognition server system then detects and processes incoming voice signals associated with the request for service. The incoming voice signal is converted into a symbolic data file using a template matching process, Fourier transform method, linear predictive coding scheme or any suitable speech recognition coding scheme and sent to the requesting mobile device (or a designated third party device) using a data communication channel that may include an intermediate server device (e.g. link server device 106 of FIG. 1).

The symbolic data file may be in a format that is suitable for processing by the requesting mobile device (e.g. cHTML, WML or HDML) or may be in a format suitable for processing by an intermediate server device (e.g. HTML, WML, XML, ASCII etc.). In the latter case the intermediate server device may perform any conversion process required if any.

According to the principles of the present invention, a user interacting with a mobile device would be able to access remotely available speech recognition services based in a server device running a speech recognition application (e.g. a speech recognition server system). Software stored on the phone (e.g. a microbrowser) assists the user in this interaction by retrieving and managing contact information for the server device and by providing prompts and performing functions related to interactions with the speech recognition server system. Using this system and method, mobile devices having limited processing and storage capability have access to full featured speech recognition applications running on powerful computer workstations.

FIG. 7 is a flow diagram, which illustrates the process 700 utilized by a speech recognition server system (e.g. speech recognition server system 109) to interact with a mobile device (e.g. mobile device 102) from the perspective of the speech recognition server system. At 704 a determination is made (i.e. by a software process) as to whether a voice circuit/channel has been established between the speech recognition server system (e.g. speech recognition server system 109) and a mobile device requesting services (e.g. mobile device 102).

If at 704 it is determined that a voice circuit/channel has been established with a mobile device requesting services then another determination is made at 708 as to whether a speech signal has been detected. If a speech signal is detected at 708 the received speech input 716 is utilized to generate a symbolic data file at 712.

As previously stated, the symbolic data file is a file containing a plurality of letters, phonemes, words, figures, objects, functions, control characters or other conventional marks designating an object, quantity, operation, function, phoneme, word, phrase or any combination thereof having some relationship to the received speech signal as interpreted by the speech recognition system. Voice recognition systems generally use voice templates, Fourier Transform coding, or a linear predictive coding scheme to map the voiced input components to pre-stored symbolic building blocks. Examples of symbolic data files include ASCII files and binary data files.

The symbolic data file is then sent to the requesting mobile device (or designated third party device) at 720. At 724 it is determined whether a termination command has been received from the mobile device requesting services. If a termination command is received then the process is ended. If a termination command is not received then the process continues to look for an incoming speech signal at 708. If at 708 a speech signal is not received within a pre-determined time period then a determination is made at 728 as to whether a termination command has been received. If a termination command has been received then the process is terminated. Of course the system could have predetermined time-outs or cycle limits that could result in process termination even if a termination command has not been received.

If at 704 it is determined that a voice circuit/channel has not been established with a mobile device requesting services then the speech recognition server system awaits the establishment of an active voice channel with a mobile device desiring speech recognition services.

According to the principles of the present invention, the speech recognition server system functions as an extension of the user interface of the mobile device. For example a user can choose to use speech recognition services for lengthy interactions that would under normal circumstances require considerable time and effort to input using the local user interface. In addition, since the resources of the mobile device do not limit the speed recognition application used, the user can be provided access to a vast vocabulary.

The advantages of the present invention are numerous. Different implementations may yield one or more of the following advantages. One advantage of the present invention is that users of certain mobile devices (e.g. devices with limited processing and storage capability) are enabled to utilize a fully functional speech recognition application running on a remote server device to augment the standard device user interface.

Another advantage of the present invention is that since the speech recognition application utilized is not restricted by the processing and storage limitations of the mobile device, the user may be provided with the functionality of a full feature speech recognition application running on a more powerful computer. Advantages associated with this functionality include providing the user with multiple language dictionaries having large vocabularies and personalized dictionaries. Additionally, since the speech recognition application is not stored on the mobile device, there is little or no impact on the per-unit cost of the mobile device. Still another advantage of the present invention is that the carriers providing this service can charge the users a small service fee for access to it.

Yet another advantage of the present invention is that a user can utilize speech recognition services and the local user interface (e.g. a phone keypad) concurrently, thus providing the user with maximum flexibility. For example, the user can input a voice signal and intermingle symbols from the local user interface.

The many features and advantages of the present invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

I claim:

1. A method of providing speech recognition services to a wireless communication device having a display screen and a user interface, comprising:
   receiving a request from the wireless communication device for speech recognition services at a server device running a speech recognition application;
   retrieving a voice input signal associated with the request from a first communication path;
   converting the voice input signal into a symbolic data file using the speech recognition application; and
   sending the symbolic data file to the wireless communication device using a second communication path.

2. A method as recited in claim 1, wherein the first communication path is established on a wireless communication network.

3. A method as recited in claim 2, wherein the wireless network is selected from a group consisting of cellular digital packet data (CDPD) network, Global System for Mobile Communication (GSM) network, Code Division Multiple Access (CDMA) network, Personal Handy Phone System (PHS) and Time Division Multiple Access (TDMA) network.

4. A method as recited in claim 1, wherein the symbolic data file is a markup language file.

5. A method as recited in claim 4, wherein the markup language file is selected from a group consisting of Handheld Device Markup Language (HDML), Hypertext Markup Language (HTML), compact HTML (cHTML), Wireless Markup Language (WML), Standard Generalized Markup Language (SGML) and Extensible Markup Language (XML).

6. A method as recited in claim 1, wherein the symbolic data file is a binary data file.

7. A method as recited in claim 1, wherein the symbolic data file is an ASCII formatted data file.

8. A method as recited in claim 1, wherein the second communication path includes a link server device connected to the server device running the speech recognition application by a wired network using a first communication protocol and to the wireless communication device by a wireless network using a second communication protocol.

9. A method as recited in claim 8, wherein the first communication protocol is selected from a group consisting of Transmission Control Protocol/Internet Protocol (TCP/IP), Hypertext Transport Protocol (HTTP) and Secure Hypertext Transport Protocol (sHTTP).

10. A method as recited in claim 8, wherein the second communication protocol is a wireless communication protocol.

11. A method as recited in claim 10, wherein the wireless communication protocol is selected from a group consisting of Wireless Access Protocol (WAP) and Handheld Device Transport Protocol (HDTP).

12. A method as recited in claim 1, wherein the request received from the wireless communication device includes user specific identification information.

13. A method as recited in claim 12, wherein the user specific identification information is utilized to retrieve user specific files to process the request for speech recognition services.

14. A method as recited in claim 1, wherein the request received from the wireless communication device includes device specific identification information.

15. A method as recited in claim 14, wherein the device specific identification information is utilized to retrieve user specific files to process the request for speech recognition services.

16. A method as recited in claim 14, wherein the device specific identification information is selected from a group consisting of a phone number and a Uniform Resource Identifier (URI).

17. A method as recited in claim 1, wherein the wireless communication device is a mobile phone.

18. A method as recited in claim 17, wherein the mobile phone includes a microprocessor and a storage area for software.

19. A method as recited in claim 18, wherein the microprocessor utilizes the software stored in the storage area to control a phone function and a local application.

20. A method as recited in claim 19, wherein the local application provides functions relating to obtaining speech recognition services.

21. A method of providing speech recognition services to a wireless communication device having a display screen and a user interface, comprising:
   retrieving contact information for a server device running a speech recognition application;
   generating a request for speech recognition services from the server device associated with the retrieved contact information;
   sending the request for speech recognition services to the server device associated with the retrieved contact information;
   establishing a voice communication channel between the wireless communication device and the server device associated with the retrieved contact information;
   receiving input from a user using the wireless communication device, at least a portion of the input including a voice component;
   transmitting the user input to the server device for processing by the speech recognition application;
   receiving a symbolic data file from the server device associated with the retrieved contact information, the symbolic data file including a processed output of speech recognition processing of the user input by the server device;
   processing the received symbolic data file using local resources of the wireless communication device; and displaying at least a portion of the processed symbolic data file to the user.

22. A method as recited in claim 21, wherein the contact information is selected from a group consisting of a phone number and a Uniform Resource Identifier (URI).

23. A method as recited in claim 21, wherein the voice communication channel is established on a wireless network.

24. A method as recited in claim 23, wherein the wireless network is selected from a group consisting of cellular digital packet data (CDPD) network, Global System for Mobile Communication (GSM) network, Code Division Multiple Access (CDMA) network, Personal Handy Phone System (PHS) and Time Division Multiple Access (TDMA) network.

25. A method as recited in claim 24, wherein the received symbolic data file is a markup language file.

26. A method as recited in claim 25, wherein the markup language file is selected from a group consisting of Handheld Device Markup Language (HDML), Hypertext Markup Language (HTML), compact HTML (cHTML), Wireless Markup Language (WML), Standard Generalized Markup Language (SGML) and Extensible Markup Language (XML).

27. A method as recited in claim 24, wherein the symbolic data file is a binary data file.

28. A method as recited in claim 24, wherein the symbolic data file is an ASCII formatted data file.

29. A computer readable medium on which is encoded computer program code for generating a request for speech recognition services for a wireless communication device, comprising:

computer program code for retrieving contact information for a server device providing speech recognition services;

computer program code for generating a request for speech recognition services from the server device associated with the retrieved contact information;

computer program code for sending the request for speech recognition services to the server device;

computer program code for receiving voice input from a user of the wireless communication device, the input being associated with the request for speech recognition services; and computer program code for establishing a voice communication session between the wireless communication device and the server device;

computer program code for transmitting the received voice input to the server device for speech recognition processing;

computer program code for processing a symbolic data file received from the server device, the symbolic data file including processed output of the speech recognition processing by the server device; and computer program code to display at least a portion of the processed symbolic data file of the processed symbolic data file to the user.

30. A computer readable medium as recited in claim 29, wherein the contact information is selected from a group consisting of a phone number and a Uniform Resource Identifier (URI).

31. A computer readable medium on which is encoded computer program code for providing speech recognition services to a wireless communication device, comprising:

computer program code for processing a request for speech recognition services received from a mobile device;

computer program code for receiving a voice input associated with the request for speech recognition services;

computer program code for converting the received voice input into a symbolic data file; and computer program code for sending the symbolic data file to the mobile device originating the request.

32. A computer readable medium as recited in claim 31, wherein the symbolic data file is a markup language file.

33. A computer readable medium as recited in claim 32, wherein the markup language file is selected from a group consisting of Handheld Device Markup Language (HDML), Hypertext Markup Language (HTML), compact HTML (cHTML), Wireless Markup Language (WML), Standard Generalized Markup Language (SGML) and Extensible Markup Language (XML).

34. A computer readable medium as recited in claim 31, further comprising:

computer program code for retrieving user specific files associated with the request; and computer program code for utilizing the user specific files in the conversion process to convert the voice input into a symbolic data file.

35. A computer readable medium as recited in claim 34, wherein the user specific files contain user preferences.

36. A computer readable medium as recited in claim 34, wherein the user specific files contain user voice templates.

37. A wireless communication system providing speech recognition services, comprising:

a wireless communication device providing voice input for speech recognition processing on a first communication path and receiving a symbolic data file representing the processed voice input on a second communication path; and a server device running a speech recognition application receiving voice input from the wireless communication device on the first communication path, converting the received voice input into a symbolic data file and sending the symbolic data file to the wireless device using the second communication path.

38. A wireless communication system as recited in claim 37, wherein the first communication path is established on a wireless network.

39. A wireless communication system as recited in claim 38, wherein the wireless network is selected from a group consisting of cellular digital packet data (CDPD) network, Global System for Mobile Communication (GSM) network, Code Division Multiple Access (CDMA) network, Personal Handy Phone System (PHS) and Time Division Multiple Access (TDMA) network.

40. A wireless communication system as recited in claim 39, wherein the second communication path includes a link server device connected to the server device running the speech recognition application by a wired network using a first communication protocol and to the wireless communication device by a wireless network using a second communication protocol.

41. A wireless communication system as recited in claim 40, wherein the first communication protocol is selected from a group consisting of Transmission Control Protocol/Internet Protocol (TCP/IP), Hypertext Transport Protocol (HTTP) and Secure Hypertext Transport Protocol (sHTTP).

42. A wireless communication system as recited in claim 40, wherein the second communication protocol is a wireless communication protocol.

43. A wireless communication system as recited in claim 42, wherein the wireless communication protocol is selected from a group consisting of Wireless Access Protocol (WAP) and Handheld Device Transport Protocol (HDTP).

44. A wireless communication system as recited in claim 37, wherein the wireless communication device is a mobile phone.

45. A wireless communication system as recited in claim 44, wherein the mobile phone includes a microprocessor and a storage area for software.

46. A wireless communication system as recited in claim 45, wherein the microprocessor utilizes the software stored in the storage area to control a phone function and a local application.

47. A wireless communication system as recited in claim 46, wherein the local application provides functions relating to obtaining speech recognition services.

48. An apparatus for providing speech recognition services to a wireless communication device, the apparatus comprising:

a processing system; and a memory coupled to the processing system, storing a speech recognition application, which when executed by the processing system causes the apparatus to:

receive a request from the wireless communication device for speech recognition services;

retrieve a voice input signal associated with the request from a first communication path;

convert the voice input signal into a symbolic file using the speech recognition application; and send the symbolic data file to the wireless communication device using a second communication path.

49. An apparatus as recited in claim 48, wherein the second communication path includes a link server device connected to the apparatus by a wired network using a first communication protocol and to the wireless communication device by a wireless network using a second communication protocol.

50. An apparatus as recited in claim 49, wherein the received symbolic data file is a markup language file.

51. An apparatus as recited in claim 50, wherein the markup language file is selected from a group consisting of Handheld Device Markup Language (HDML), Hypertext Markup Language (HTML), compact HTML (cHTML), Wireless Markup Language (WML), Standard Generalized Markup Language (SGML), and Extensible Markup Language (XML).

52. An apparatus as recited in claim 50, wherein the symbolic data file is a binary data file.

* * * * *